United States Patent
Mukasa (10) Patent No.: US 6,470,126 B1
(45) Date of Patent: Oct. 22, 2002

(54) DISPERSION COMPENSATING OPTICAL FIBER, AND WAVELENGTH DIVISION MULTIPLEXING TRANSMISSION LINE USING A DISPERSION COMPENSATING OPTICAL FIBER

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/582,108

(22) PCT Filed: Oct. 21, 1999

(86) PCT No.: PCT/JP99/05816

§ 371 (c)(1),
(2), (4) Date: Jun. 22, 2000

(87) PCT Pub. No.: WO00/25158

PCT Pub. Date: May 4, 2000

(30) Foreign Application Priority Data

Oct. 23, 1998 (JP) .......... 10-319920

(51) Int. Cl.$^7$ .............. G02B 6/16
(52) U.S. Cl. .......... 385/123; 385/126; 385/127
(58) Field of Search .......... 385/123, 124–128

(56) References Cited

U.S. PATENT DOCUMENTS

| | | | |
|---|---|---|---|
| 5,361,319 A | 11/1994 | Antos et al. | 385/123 |
| 5,568,583 A | 10/1996 | Akasaka et al. | 385/123 |
| 5,673,354 A | 9/1997 | Akasaka et al. | 385/127 |
| 5,742,723 A | 4/1998 | Ohnishi et al. | 385/127 |

(List continued on next page.)

FOREIGN PATENT DOCUMENTS

| | | | |
|---|---|---|---|
| EP | 0 729 919 A2 | 9/1996 | C03B/37/027 |
| JP | 62-275204 | 11/1987 | G02B/6/10 |
| JP | 8-190030 | 7/1996 | G02B/6/255 |
| JP | 10-325913 | 12/1998 | G02B/6/16 |
| JP | 11-84158 | 3/1999 | G02B/6/22 |

OTHER PUBLICATIONS

"Large Volume Manufacturing of Dispersion Compensating Fibers" 1998 Optical Fiber Communication Conference, May 29, 1998 OFC Technical Digest.
"Novel Network Fiber to Manage Dispersion at 1.55 $\mu$m with Combination of 1.3 $\mu$m Zero Dispersion Single Mode Fiber" 11$^{th}$ International Conference on Integrated Optics and Optical Fiber Communications Sep. 22, 1997.
International Search Report Nov. 19, 1999.

Primary Examiner—Ellen E. Kim
(74) Attorney, Agent, or Firm—LaCasse & Associates (57) ABSTRACT

The invention relates to a dispersion compensating optical fiber which is connected to an optical fiber having a positive dispersion value at wavelength band of 1.55 $\mu$m and concurrently has a function of compensating dispersion of optical fibers having a positive dispersion value and a function acting as an optical transmission line, and relates to a wavelength division multiplexing optical transmission line using the dispersion compensating optical fiber. The refractive index profile of the dispersion compensating optical fiber is determined to be W-shaped. $1.0\% \leq \Delta 1 \leq 1.4\%$ and $-0.45 \leq \Delta 2/\Delta 1 \leq -0.285$ are established where the relative refractive index difference of said center core (1) with respect to said cladding (3) is $\Delta 1$, and the relative refractive index difference of said side core (2) with respect to said cladding (3) is $\Delta 2$, and further $0.4 \leq Ra \leq 0.5$ is established where the value Ra(Ra=a/b) of the outer diameter a of the center core (1) with respect to the outer diameter b of the side core (2) is Ra. The dispersion slope at a wavelength of 1.55 $\mu$m is negative, and the dispersion value $\sigma$ is $-50$ ps/nm/km $\leq \sigma < -20$ ps/nm/km, wherein the transmission loss is 0.25 dB/km or less, the polarization mode dispersion value is 0.15 ps/km$^{1/2}$ or less, and the mode field diameter is 5.5 $\mu$m or more.

26 Claims, 3 Drawing Sheets

U.S. PATENT DOCUMENTS

| | | |
|---|---|---|
| 5,802,235 A | 9/1998 | Akasaka ..................... 385/123 |
| 5,838,867 A | 11/1998 | Onishi et al. ................ 385/123 |
| 5,933,561 A | 8/1999 | Sugizaki ..................... 385/123 |
| 5,995,695 A * | 11/1999 | Aikawa et al. ............. 385/123 |
| 6,084,993 A * | 7/2000 | Mukasa ...................... 385/122 |
| 6,301,419 B1 * | 10/2001 | Tsukitani et al. ........... 385/123 |
| 6,347,174 B1 * | 2/2002 | Onishi et al. ................ 359/326 |
| 2002/0031317 A1 * | 3/2002 | Tsukitani et al. ........... 385/123 |
| 2002/0054742 A1 * | 5/2002 | Shimotakahara et al. ... 385/123 |
| 2002/0057880 A1 * | 5/2002 | Hirano et al. ................ 385/127 |

* cited by examiner

DISPERSION COMPENSATING OPTICAL FIBER, AND WAVELENGTH DIVISION MULTIPLEXING TRANSMISSION LINE USING A DISPERSION COMPENSATING OPTICAL FIBER

TECHNICAL FIELD OF THE INVENTION

The present invention relates to a dispersion compensating optical fiber used in, for example, wavelength division multiplexing transmissions, and a wavelength division multiplexing transmission line using a dispersion compensating optical fiber.

BACKGROUND OF THE INVENTION

Single mode optical fibers having zero dispersion at a wavelength band of 1.3 μm have been laid in the world over as transmission networks for optical transmissions. Recently, the amount of transmission information has been remarkably increased in line with development of an information society. Further, in line with an increase in such information, a wavelength division multiplexing transmission (WDM transmission) has been widely accepted in the field of transmissions, wherein now an age of wavelength division multiplexing transmission has arrived. The wavelength division multiplexing transmission is a system in which the wavelength of optical transmission is not a single mode but wherein optical signals are transmitted with the wavelength divided into a plurality, and the system is an optical transmission system suitable for high bit rate and high rate transmissions.

However, in a case where a wavelength division multiplexing transmission is carried out using a wavelength band of 1.3 μm while using the existing single mode optical fiber having zero dispersion at a wavelength band of 1.3 μm, since the wavelength band (for example, 1.52 through 1.62 μm) of 1.55 μm which is a gain band of normal optical amplifiers is not coincident with the wavelength band of 1.3 μm, normal optical amplifiers cannot be used. Further, since the transmission at the wavelength band of 1.3 μm is large, there remains a problem which hinders long-haul optical transmissions. In order to avoid this problem, researches have been carried out, in which wavelength division multiplexing transmissions are executed at a wavelength band of 1.55 μm using the existing single mode optical fiber having zero dispersion at a wavelength band of 1.3 μm.

However, if an optical transmission is performed at a wavelength band of 1.55 μm using a single mode optical fiber having zero dispersion at the wavelength band of 1.3 μm, the dispersion of signals of respective wavelength division multiplexing wavelengths is increased as optical signals propagate in a transmission single mode optical fiber since the existing single mode optical fibers positive dispersion and positive dispersion slope at the wavelength band of 1.55 μm is increased. Therefore, it becomes difficult to separate signals at the receiving side, whereby the quality of optical transmission is worsened, and such a problem occurs, by which the reliability of optical transmission is lost.

Accordingly, recently, in order to solve these problems, a dispersion compensating optical fiber has been developed. The dispersion compensating optical fiber has negative dispersion. If the dispersion compensating optical fiber is connected to the receiving side of a single mode optical fiber, positive dispersion of optical signals transmitted through the single mode optical fiber is nullified by negative dispersion of the dispersion compensating optical fiber, wherein the optical signals are received in a state where the dispersion thereof at the receiving side becomes an almost zero dispersion. Thus, by connecting a dispersion compensating optical fiber to a single mode optical fiber, the respective wavelength division multiplexed optical signals can be separated at the receiving side, whereby a high bit rate and high rate optical transmission of high quality can be expected.

When using this type of dispersion compensating optical fiber, dispersion is compensated by connecting as short a dispersion compensating optical fiber as possible to the receiving side of a single mode optical fiber. To suit this usage, a dispersion compensating optical fiber developed previously is generally produced in the form of a module. As one of the examples, there is proposed a concept of an optical fiber suitable for a dispersion compensating optical fiber module disclosed in, for example, Japanese Laid-Open Patent Publication No. 11620 of 1994.

However, Japanese Laid-Open Patent Publication No. 11620 of 1994 does not provide any information regarding a profile of detailed refractive indexes of a dispersion compensating optical fiber. For this reason, it was impossible to specify the optimal refractive index profile of such dispersion compensating optical fibers as described above.

Further, in order to compensate dispersion by a short fiber length with a dispersion compensating optical fiber produced in the form of a module, it is necessary for a moduled dispersion compensating optical fiber to have high negative dispersion and high dispersion slope. If it is attempted that a dispersion compensating optical fiber has high negative dispersion and high dispersion slope, conditions of various types of parameters to define the refractive index profile of a dispersion compensating optical fiber are made severe, whereby it becomes very difficult to produce such dispersion compensating optical fibers. Moreover, if a dispersion compensating optical fiber is of such a refractive index profile structure as to have high negative dispersion and a high negative dispersion slope, a non-linear phenomenon is necessarily likely to occur, and the mode field diameter (MFD) of optical fibers is decreased. If the non-linear phenomenon occurs, the signal waveform may be distorted, which will cause another problem in achieving a high bit rate and a high rate in wavelength division multiplexing transmissions.

Further, as the mode field diameter of the optical fiber is decreased, still another problem arises, in which the non-linear phenomenon is likely to occur or the connection loss is increased when the dispersion compensating optical fiber is connected to a single mode optical fiber.

On the other hand, another optical transmission system is proposed, in which optical transmissions are carried out by using a dispersion shifted optical fiber in which the zero dispersion wavelength is shifted from a wavelength band of 1.3 μm to a wavelength band of 1.55 μm. By transmitting optical signals at a wavelength of 1.55 μm using a dispersion shifted optical fiber having zero dispersion at a wavelength band of 1.55 μm, it becomes possible to transmit signals free from any dispersion. However, in general, since a dispersion shifted optical fiber has a dispersion slope, no dispersion is produced for a zero dispersion wavelength at the wavelength band of 1.55 μm if a wavelength division multiplex transmission is carried out using signals at a wavelength band of 1.55 μm, but dispersion is produced with respect to signals in the vicinity of the wavelength band of 1.55 μm. Therefore, the optical transmission system in which a dispersion shifted optical fiber is used is not suitable for a high bit rate and high rate wavelength division multiplexed optical transmissions. Also, this type of dispersion shifted optical fiber has such a tendency, whereby a non-linear phenomenon is likely to occur, differing from a single mode optical fiber.

Therefore, the present inventor changed the conventional idea from a dispersion compensating optical fiber being made into a moduled optical fiber exclusive for dispersion compensation to an optical fiber which has both functions of dispersion compensation and action as a line which becomes a part of an optical transmission line. That is, in order to cause the optical compensating optical fiber to function as an optical transmission line, the length of a dispersion compensating optical fiber is made one-third or more the length of an optical fiber having a positive dispersion value at a wavelength band of 1.55 μm such as a single mode optical fiber; the dispersion compensating optical fiber is connected to an optical fiber having a positive dispersion value at a wavelength band of 1.55 μm; the dispersion compensating optical fiber is caused to assume the roles of dispersion compensation and an optical transmission line, which transmits optical signals while compensating dispersion of the optical signals propagating through an optical fiber having a positive dispersion value at a wavelength band of 1.55 μm; a line in which an optical fiber having a positive dispersion value at a wavelength band of 1.55 μm and a dispersion compensating optical fiber are connected to each other is made into a new line of a wavelength division multiplex transmission line; and the present inventor propose the idea of a dispersion compensating optical fiber enabling construction of such a new line, and a new wavelength division multiplexed optical transmission line using such a dispersion compensating optical fiber.

The present invention was developed on the basis of the above ideas, and it is therefore a first object of the invention to provide a dispersion compensating optical fiber concurrently having the function of dispersion compensation and the function as an optical transmission line, and a second object of the invention to provide a wavelength division multiplexing transmission line which is composed by connecting an optical fiber having a positive dispersion value at a wavelength band of 1.55 μm and the dispersion compensating optical fiber to each other and has a lower non-linearity, a lower loss characteristic than those in the prior arts, and excellent optical transmission properties.

DISCLOSURE OF THE INVENTION

In order to achieve the abovementioned objects, the invention is featured in the following constructions. That is, a first dispersion compensating optical fiber of the invention is a dispersion compensating optical fiber which compensates a dispersion characteristic of an optical fiber having a positive dispersion value at a wavelength band of 1.55 μm, which is featured in that the dispersion value and dispersion slope are negative at a wavelength band of 1.55 μm, the transmission loss is 0.3 dB/km or less, the polarization mode dispersion value is 0.15 ps/km$^{1/2}$ or less, and the mode field diameter is 5.5 μm or more.

A second dispersion compensating optical fiber of the invention is featured in that, in addition to the construction of the first dispersion compensating optical fiber, the dispersion value a at a wavelength band of 1.55 μm is $-50$ ps/nm/km $\leq \sigma < -20$ ps/nm/km.

A third dispersion compensating optical fiber of the invention is featured in that, in addition to the construction of the first dispersion compensating optical fiber, the dispersion value a at a wavelength band of 1.55 μm is $-20$ ps/nm/km $\leq \sigma \leq -10$ ps/nm/km.

Further, a fourth dispersion compensating optical fiber of the invention is featured in that, in addition to the construction of the second dispersion compensating optical fiber, the transmission loss at a wavelength band of 1.55 μm is 0.25 dB/km or less.

Further, a fifth dispersion compensating optical fiber of the invention is featured in that, in addition to the construction of the third dispersion compensating optical fiber, the transmission loss at a wavelength band of 1.55 μm is 0.25 dB/km or less.

A sixth dispersion compensating optical fiber of the invention is featured in that, in addition to any one of the constructions of the first through the fifth dispersion compensating optical fibers of the invention, the outer circumferential side of the center core is covered with a side core whose refractive index is lower than that of the center core, and the outer circumferential side of the side core is covered with cladding whose refractive index is higher than that of the side core but lower than that of the center core, wherein $1.0\% \leq \Delta 1 \leq 1.4\%$ and $-0.45 \leq \Delta 2/\Delta 1 < -0.285$ are created where the relative refractive index difference of the center core with respect to the cladding is $\Delta 1$ and the relative refractive index difference of the side core with respect to the cladding is $\Delta 2$, and $0.4 \leq Ra \leq 0.5$ where a value (a/b) of the outer diameter a of the center core to the outer diameter b of the side core is defined as Ra.

Further, a seventh dispersion compensating optical fiber of the invention is featured in that, in addition to any one of the constructions of the first through the fifth dispersion compensating optical fibers of the invention, the mode field diameter is 6.2 μm or more.

Further, an eighth dispersion compensating optical fiber is featured in that, in addition to the construction of the sixth dispersion compensating optical fiber, the mode field diameter is 6.2 μm or more.

Still further, a first wavelength division multiplexing transmission line of the invention is a wavelength division multiplexing transmission line constructed so that an optical fiber having a positive dispersion value at a wavelength band of 1.55 μm and any one of the first through the eighth dispersion compensating optical fibers are connected to each other, wherein a dispersion value at the wavelength band of 1.55 μm is more than and including $-1$ ps/nm/km but less than and including 1 ps/nm/km.

A second wavelength division multiplexing transmission line of the invention is a wavelength division multiplexing transmission line constructed so that an optical fiber having a positive dispersion value at a wavelength band of 1.55 μm and any one of the first through the eighth dispersion compensating optical fibers are connected to each other, wherein a deviation of the dispersion values at the wavelength band of 1.55 μm is 1 ps/nm/km or less.

A third wavelength division multiplexing transmission line of the invention is a wavelength division multiplexing transmission line constructed so that an optical fiber having a positive dispersion value at a wavelength band of 1.55 μm and any one of the first through the eighth dispersion compensating optical fibers are connected to each other, wherein the optical fiber having a positive dispersion value is a single mode optical fiber having zero dispersion at a wavelength band of 1.31 μm, and the length of the dispersion compensating optical fiber is approx. one-third or more of the length of the single mode optical fiber.

Further, a fourth wavelength division multiplexing transmission line of the invention is featured in that, in addition to the construction of the first wavelength division multiplexing transmission line, the loss at a portion of connecting an optical fiber having a positive dispersion value to a dispersion compensating optical fiber is 0.4 dB or less.

Still further, a fifth wavelength division multiplexing transmission line is featured in that, in addition to the construction of the second wavelength division multiplexing transmission line, the loss at a portion of connecting an optical fiber having a positive dispersion value to a dispersion compensating optical fiber is 0.4 dB or less.

Further, a sixth wavelength division multiplexing transmission line is featured in that, in addition to the construction of the third wavelength division multiplexing transmission line, the loss at a portion of connecting an optical fiber having a positive dispersion value to a dispersion compensating optical fiber is 0.4 dB or less.

Further, a seventh wavelength division multiplexing transmission line of the present invention is featured in that, in addition to the constructions of any one of the first through the sixth wavelength division multiplexing transmission lines, an intermediate mode field optical fiber having a mode field diameter which is between the mode field diameter of an optical fiber having a positive dispersion value and the mode field diameter of the dispersion compensating optical fiber is connected between the optical fiber having a positive dispersion value and the dispersion compensating optical fiber, and the length of the intermediate mode field optical fiber is made into 1/1000 or less of the length of an optical fiber having a positive dispersion value directly connected to the intermediate mode field optical fiber.

An eighth wavelength division multiplexing transmission line of the invention is featured in that, in addition to the constructions of any one of the first through the sixth wavelength division multiplexing transmission lines, an intermediate mode field optical fiber having a mode field diameter which is between the mode field diameter of an optical fiber having a positive dispersion value and the mode field diameter of the dispersion compensating optical fiber is connected between the optical fiber having a positive dispersion value and the dispersion compensating optical fiber, and the length of the intermediate mode field optical fiber is made into 1 m or more but 5 m or less.

Further, a ninth wavelength division multiplexing transmission line of the invention is featured in that, in addition to the construction of the seventh wavelength division multiplexing transmission line, the intermediate mode field optical fiber is a dispersion shifted optical fiber having zero dispersion at a wavelength band of 1.55 μm.

Further, a tenth wavelength division multiplexing transmission line of the invention is featured in that, in addition to the eighth wavelength division multiplexing transmission line, the intermediate mode field optical fiber is a dispersion shifted optical fiber having zero dispersion at a wavelength band of 1.55 μm.

In the invention, for example, a wavelength division multiplexing transmission line is formed by connecting a dispersion compensating optical fiber of the invention to a single mode optical fiber having zero dispersion at a wavelength band of 1.33 μm by a length equivalent to approx. one-third (for example, approx. one-third times through one time) of the length of the single mode optical fiber. Where a wavelength division multiplexing transmission is carried out using optical signals of a wavelength band of 1.55 μm using the wavelength division multiplexing transmission line, the respective wavelengths of a wavelength band 1.55 μm gradually increase the positive dispersion in line with propagation in the single mode optical fiber.

Although wavelength division multiplexed optical signals of the respective wavelengths are caused to propagate, changing the single mode optical fiber to the wavelength compensating optical fiber, the dispersion compensating optical fiber of the invention has a negative dispersion slope at a wavelength band of 1.55 μm, and the dispersion value σ at the abovementioned wavelength band is a negative dispersion value in a range of −50 ps/nm/km≦σ<−20 ps/nm/km or −20 ps/nm/km≦σ≦−10 ps/nm/km. The dispersion value of the single mode optical fiber at a wavelength band of 1.55 μm is approx. 17 ps/nm/km. Therefore, by connecting a dispersion compensating optical fiber of the invention to the single mode optical fiber by a length exceeding approx. one-third of the length of the single mode optical fiber, in compliance with the dispersion value, the dispersion increased through propagation in the single mode optical fiber is compensated by the dispersion value a of the dispersion compensating optical fiber in a nullifying direction while propagating in the dispersion compensating optical fiber. And, optical signals can be received in a state where the dispersion of the respective wavelengths in multiplexed wavelength divisions is nullified and compensated at the terminal end of the dispersion compensating optical fiber.

Further, since a dispersion compensating optical fiber of the invention has a negative dispersion slope at a wavelength band of 1.55 μm, a positive dispersion slope at a wavelength band of 1.55 μm of a single mode optical fiber is nullified by the dispersion compensating optical fiber of the invention.

Still further, a dispersion compensating optical fiber of the invention is not a short moduled optical fiber as in the prior arts, to function not only to compensate the dispersion of a single mode optical fiber, but also as an optical fiber for optical transmissions. Therefore, the absolute value of a dispersion value at a wavelength band of 1.55 μm as described above is made smaller than the absolute value of the dispersion value of the prior arts short moduled optical fiber, whereby the conditions for regulating the refractive index profile are slackened, and, in line therewith, since the mode field diameter can be increased, it is possible to form a dispersion compensating optical fiber provided with a non-linear property. Therefore, a dispersion compensating optical fiber of the invention can suppress distortions of the waveforms in wavelength division multiplexing transmission, and becomes suitable for laying cables.

Still further, since, in the dispersion compensating optical fiber of the invention, the transmission loss at a wavelength band of 1.55 μm is 0.3 dB/km or less (preferably, 0.25 dB/km or less), the polarization mode dispersion value at the wavelength band of 1.55 μm is 0.15 ps/km$^{1/2}$ or less, and the mode field diameter is 5.5 μm or less, the respective properties such as the transmission loss property, polarization mode dispersion property, etc., become excellent as a dispersion compensating optical fiber. Accordingly, when a wavelength division multiplexed light is caused to pass through the dispersion compensating optical fiber, the light can be transmitted without any hindrance due to loss and distortions (distortions due to chromatic dispersion and polarization mode dispersion) equivalent to those when the wavelength division multiplexed light is caused to pass through a dispersion shifted optical fiber having a zero dispersion wavelength at a wavelength band of 1.55 μm, which is presently used. Therefore, a dispersion compensating optical fiber of the invention becomes suitable for laying cables in terms of this point.

Moreover, since a dispersion compensating optical fiber of the invention has a mode field diameter of 5.5 μm or more (more preferably 6.2 μm), it is possible to reduce the connection loss due to a difference between the mode field diameter of a single mode optical fiber and that of the dispersion compensating optical fiber. Accordingly, the transmission loss of a wavelength division multiplexing transmission line constructed by connecting a single mode optical fiber with a dispersion compensating optical fiber can be decreased, whereby a high bit rate and high rate wavelength division multiplexing transmission of high quality can be brought about.

Further, a dispersion compensating optical fiber of the invention is formed so that the outer circumferential side of the center core is covered with a side core whose refractive index is lower than that of the center core, the outer circumferential side of the side core is covered with cladding whose refractive index is higher than that of the side core but is lower than that of the center core, and the refractive index profile of the dispersion compensating optical fiber is, for example, a W-shaped profile. Therefore, it is possible to easily produce optical fibers of a refractive index structure, which are provided with the above established conditions of a dispersion compensating optical fiber. Furthermore, if the refractive index profile of a dispersion compensating optical fiber is established so that the range of $\Delta 1$ is $1.0\% \leq \Delta 1 \leq 1.4\%$, and the range of $\Delta 2/\Delta 1$ is $-0.45 \leq \Delta 2/\Delta 1 \leq -0.285$ where the relative refractive index difference of the center core with respect to the cladding is $\Delta 1$ and the relative refractive index difference of the side core with respect to the cladding is $\Delta 2$, and the range of Ra is $0.4 \leq Ra \leq 0.5$ where a value (a/b) of the outer diameter a of the center core to the outer diameter b of the side core is defined as Ra, it is possible to inexpensively provide a dispersion compensating optical fiber which can be easily produced and has excellent features as described above, and a wavelength division multiplexing transmission line using the dispersion compensating optical fiber. And, both a low non-linear property and a low bending loss property can be securely achieved. Therefore, it is possible to sufficiently increase the optical transmission property of a wavelength division multiplexing transmission line constructed by connecting a dispersion compensating optical fiber of the invention and an optical fiber having a positive dispersion value at a wavelength band of 1.55 μm to each other.

Still further, since a wavelength division multiplexing transmission line using a dispersion compensating optical fiber of the invention is formed by connecting a single mode optical fiber having zero dispersion at, for example, a wavelength band of 1.3 μm, and the dispersion compensating optical fiber of the invention having a length exceeding approx. one-third of the single mode optical fiber to each other, the wavelength division multiplexing transmission line can greatly contribute to construction of an excellent wavelength division multiplexing transmission system in which the dispersion property at a wavelength of 1.55 μm is flat, has a low non-linear property and a reduced bending loss, and by which distortions of transmitted wavelength division multiplexed light are remarkably reduced.

Further, by the connection loss at a connection portion between an optical fiber having a positive dispersion value at a wavelength of 1.55 μm and a dispersion compensating optical fiber being made less than 0.4 dB, the loss of the entire optical transmission line can be made slight. For example, where the length of an optical fiber having a positive dispersion value at a wavelength band of 1.55 μm is made into 20 through 30 km, the length of a dispersion compensating optical fiber is made into 20 through 10 km, the entire length of the optical transmission line is made into 40 km, and the transmission losses of the optical fiber having a positive dispersion value at a wavelength band of 1.55 μm and the dispersion compensating optical fibers are, respectively, made into approx. 0.2 dB/km, the abovementioned connection loss becomes one-twentieth of the transmission loss of the entire length of the optical transmission line. Therefore, the connection loss is so small as can be disregarded, with respect to the loss level of the optical transmission line.

In other words, where the connection loss is 0.4 dB, it is equivalent to a loss equivalent to a length of 2 km of an optical fiber whose transmission loss is approx. 0.2 dB/km, the length of 2 km of an optical fiber is equivalent to only one-twentieth of the entire length of an optical transmission line when the entire length thereof is 40 km. Therefore, the connection loss is so small as can be disregarded, with respect to the loss level of the entirety of an optical transmission line.

Still further, according to a wavelength division multiplexing optical transmission line of the invention in which an intermediate mode field optical fiber having a mode field diameter which is between the mode field diameter of an optical fiber having a positive dispersion value at a wavelength band of 1.55 μm and the mode field diameter of the dispersion compensating optical fiber is connected between the optical fiber having a positive dispersion value and the dispersion compensating optical fiber, a value obtained by adding a connection loss generated due to a difference between the mode field diameter of the intermediate mode field optical fiber and that of the dispersion compensating optical fiber to the connection loss generated by a difference between the mode field diameter of an optical fiber having a positive dispersion value at a wavelength band of 1.55 μm and that of the intermediate mode field optical fiber becomes smaller than the connection loss generated by a difference between the mode field diameter of the optical fiber having a positive dispersion value at a wavelength band of 1.55 μm and that of the dispersion compensating optical fiber.

Therefore, by causing the intermediate mode field optical fiber to intervene between the optical fiber having a positive dispersion value at a wavelength band of 1.55 μm and the dispersion compensating optical fiber, it becomes possible to make small the loss of a wavelength division multiplexing transmission line. In particular, in those in which the length of the intermediate mode field optical fiber is made less than 1/1000 of the length of an optical fiber having a positive dispersion value at a wavelength band of 1.55 μm, which is directly connected to the intermediate mode field optical fiber, influences of a dispersion slope which the intermediate mode field optical fiber has are not given to a wavelength division multiplexing transmission line formed by an optical fiber having a positive dispersion value at a wavelength band of 1.55 μm and a dispersion compensating optical fiber of the invention. Therefore, it is possible to maintain a low loss property and a flat dispersion property at the wavelength band of 1.55 μm and to construct an excellent wavelength division optical transmission system with excellent properties of the abovementioned dispersion compensating optical fiber.

Further, in those in which an intermediate mode field optical fiber is connected between an optical fiber having a positive dispersion value at a wavelength band of 1.55 μm and a dispersion compensating optical fiber, and the length of the corresponding intermediate mode field optical fiber is more than approx. 1 m but less than approx. 5 m, an effect of suppressing the connection loss due to a difference between the mode field diameter of an optical fiber having a positive dispersion value at a wavelength band of 1.55 μm and that of a dispersion compensating optical fiber can be securely brought about, and it becomes easier still to incorporate an intermediate mode field optical fiber in an optical transmission line as a connection portion. In particular, where the length of the intermediate mode field optical fiber is short from approx. 1 m or more through approx. 5 m or less, the intermediate mode field optical fiber can be formed in the form of a module, whereby the intermediate mode field optical fiber can be further easily incorporated.

Further, a dispersion shifted optical fiber having zero dispersion at the wavelength band of 1.55 μm may be listed as an intermediate mode field optical fiber. Especially, where a single mode optical fiber having a zero dispersion wavelength at a wavelength band of 1.3 μm is used as an optical fiber having a positive dispersion value at a wavelength band of 1.55 μm, the effect of reducing the connection loss can be increased.

BEST MODE FOR CARRYING OUT THE INVENTION

Figure 1:
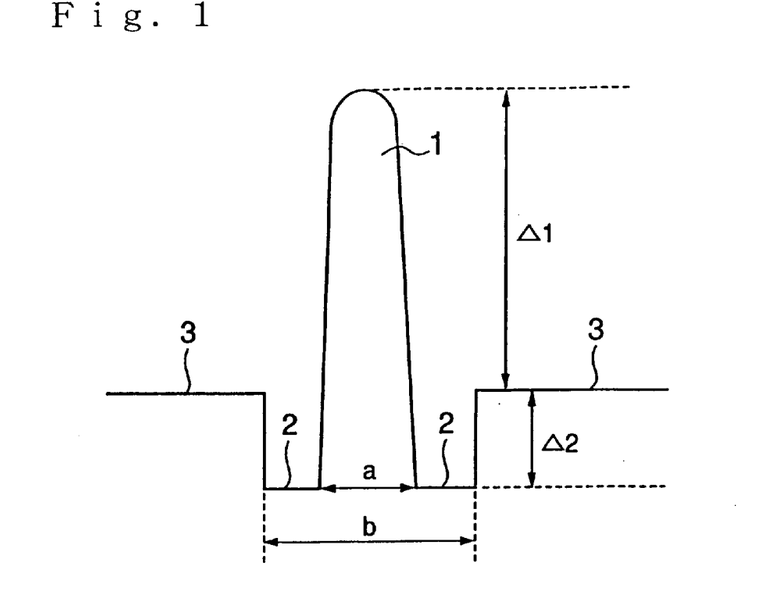
FIG. 1 is a view showing a refractive index profile of one preferred embodiment of a dispersion compensating optical fiber according to the invention.

In order to describe the invention in detail, a description is given on the basis of the accompanying drawings. FIG. 1 shows the refractive index profile of one preferred embodiment of a dispersion compensating optical fiber of the invention. Although the refractive index profile of a dispersion compensating optical fiber can be made into various types of refractive index profiles, in this preferred embodiment, a W-shaped refractive index profile as shown in FIG. 1 is employed in view of simplicity in structure, ease in designing and controlling of the refractive index structure, low transmission loss, and ease in achieving negative dispersion and negative dispersion slope.

The refractive index structure of the W-shaped profile of a dispersion compensating optical fiber is such that a side core 2 whose refractive index is lower than that of the center core 1 is disposed so as to surround the center core whose refractive index is the highest, and cladding 3 whose refractive index is higher than that of the side core 2 but is lower than that of the center core 1 is disposed so as to surround the side core 2, and the refractive index profile presents a W shape.

The cladding 3 is formed of pure silica ($SiO_2$) layer, the side core 2 is formed by doping fluorine (F), which reduces the refractive index, to a pure silica ($SiO_2$), and the center core 1 is formed by doping germanium (Ge), which increases the refractive index, to pure silica ($SiO_2$).

In the refractive index structure shown in FIG. 1, the relative refractive index difference Δ1 of the center core 1 with respect to the cladding 3 is defined by the following expression (1), where the refractive index of the center core is $n_c$, the refractive index of the side core 2 is $n_s$, and the refractive index of the cladding 3 is $n_L$;

$$\Delta 1=\{(n_c^2-n_L^2)/2n_c^2\}\times 100 \quad (1)$$

Further, the relative refractive index difference Δ2 of the side core 2 with respect to the cladding 3 is defined by the following expression (2);

$$\Delta 2=\{(n_s^2-n_L^2)/2n_s^2\}\times 100 \quad (2)$$

In the preferred embodiment, the conventional thinking, in which a dispersion compensating optical fiber is caused to function as a moduled optical fiber exclusively for dispersion compensation as in the prior arts, is converted to a new concept, a novel idea, in which the embodiment is caused to have both the function of compensating dispersion generated due to propagation in a single mode optical fiber and the function of acting as a transmission line through which optical signals are transmitted, is employed. Therefore, the dispersion value σ of a dispersion compensating optical fiber is established to −50 ps/nm/km≦σ<−20 ps/nm/km, more preferably is −20 ps/nm/km≦σ<−10 ps/nm/km. Thus, in the dispersion compensating optical fiber of the preferred embodiment, the absolute value of a dispersion value is determined to be a smaller value than the dispersion value of a moduled dispersion compensating optical fiber in the prior arts, whereby the regulations of designing the W-shaped refractive index profile is slackened, and it becomes possible to form a low non-linearity transmission line.

Further, a single mode optical fiber for transmission, which has zero dispersion at a wavelength band of 1.31 μm, has positive dispersion of approx. 17 ps/nm/km at a wavelength band of 1.55 μm, and a positive dispersion slope of approx. 0.6 ps/nm²/km at the wavelength band of 1.55 μm.

Significant points required by a dispersion compensating optical fiber are that low dispersion can be achieved in a wide range at a wavelength band of 1.55 μm and that the deviation of dispersion values of respective wavelength signals at the same wavelength band of 1.55 μm is made small to be less than 1 ps/nm/km. Therefore, the present inventor attempted to optimize the W-shaped refractive index profile, and, in order to uniformly nullify and compensate the dispersion of optical signals of respective wavelengths multiplexed in the wavelength band of 1.55 μm, which propagate through a single mode optical fiber, to almost zero dispersion, the dispersion slope at a wavelength band of 1.55 μm is made into a negative value, and more favorably, researched so that the compensation ratio of dispersion is made to as closer a value to 100% as possible. Further, the compensation ratio of this dispersion is defined by the following expression (3);

Compensation ratio=$\{S(DCF)/S(SMF)\}/\{D(DCF)/D(SMF)\}\times 100$ (3)

In the above expression (3), S(DCF) is an average value of the dispersion slope of a dispersion compensating optical fiber at a wavelength band of 1.55 μm, S(SMF) is an average value of the dispersion slope at the wavelength band of 1.55 μm of a single mode optical fiber for transmission, having zero dispersion at a wavelength band of 1.31 μm, D(DCF) is a dispersion value of the dispersion compensating optical fiber at the wavelength band of 1.55 μm, and D(SMF) is a dispersion value at the wavelength band of 1.55 μm of a single mode optical fiber for transmission, having zero dispersion at the wavelength band of 1.31 μm.

In other words, the compensation ratio being drawn near 100% means that the absolute value of a ratio of the dispersion value to the dispersion slope in a dispersion compensating optical fiber at a wavelength band of 1.55 μm is established so as to be made almost equal to that of the ratio of the dispersion value to the dispersion slope in the abovementioned single mode optical fiber with the positive and negative symbols reversed. By connecting the dispersion compensating optical fiber to the existing single mode optical fiber having zero dispersion at a wavelength band of 1.31 μm under the setting conditions, the dispersion of wavelength division multiplexed optical signals of the respective wavelengths at the wavelength band of 1.55 μm, which arise and propagate from the single mode optical fiber, is uniformly nullified and compensated at the terminal end of the dispersion compensating optical fiber.

In a dispersion compensating optical fiber having a W-shaped refractive index profile, the relative ratio RΔ between Δ2 and Δ1 (RΔ=Δ2/Δ1) is established to be −0.285 or less where the relative refractive index difference of the center core 1 to the cladding 3 is Δ1, and the relative refractive index difference of the side core 2 to the cladding 3 is Δ2, whereby inconvenience cannot be removed in production of dispersion compensating optical fibers, and if $1.0 \leq \Delta1 < 1.4$ is defined, it has been verified that a dispersion slope which has such a high compensation ratio so as to compensate the dispersion and dispersion slope at a wavelength band of 1.55 μm is obtained. Taking note of this point, the RΔ of a dispersion compensating optical fiber of the preferred embodiment is determined to be less than −0.285.

Where the RΔ is made to be −0.285 and the Δ1 is 1.11%, Table 1 shows compensation ratios of the dispersion compensating optical fiber, comparing the ratios with each other while changing the Ra (the value of the outer diameter a of the center core 1 to the outer diameter b of the side core 2 in the dispersion compensating optical fiber, that is, a value a/b). In addition, Table 1 also shows a mode field diameter (MFD), effective core cross-sectional area ($A_{eff}$), propagation refractive index (β/k: index showing the degree of satisfaction of the propagating conditions), and cutoff wavelength λc.

The dispersion described in Table 1 is actually measured values at a wavelength of 1.55 μm, and the dispersion slopes are expressed in terms of average value of the dispersion values at a wavelength band of 1.53 μm through 1.57 μm.

On the basis of the results of Table 1, it is understood that the propagation condition when the compensation ratio is approx. 100% is that Ra is established in a range from 0.35 through 0.50. Further, in those in which the bending loss is small (the cutoff wavelength λc is at the long wavelength side), Ra is in a range from 0.40 through 0.50, and synthetically, it is understood that Ra=0.45 is the most excellent.

Therefore, wherein Ra is fixed at 0.45 and Δ1 is 1.11%, the propagation property of a dispersion compensating optical fiber is examined with the value of RΔ(RΔ=Δ2/Δ1) changed. At this time, it was understood that the propagation property of the dispersion compensating optical fiber became the most satisfactory.

Figure 2:
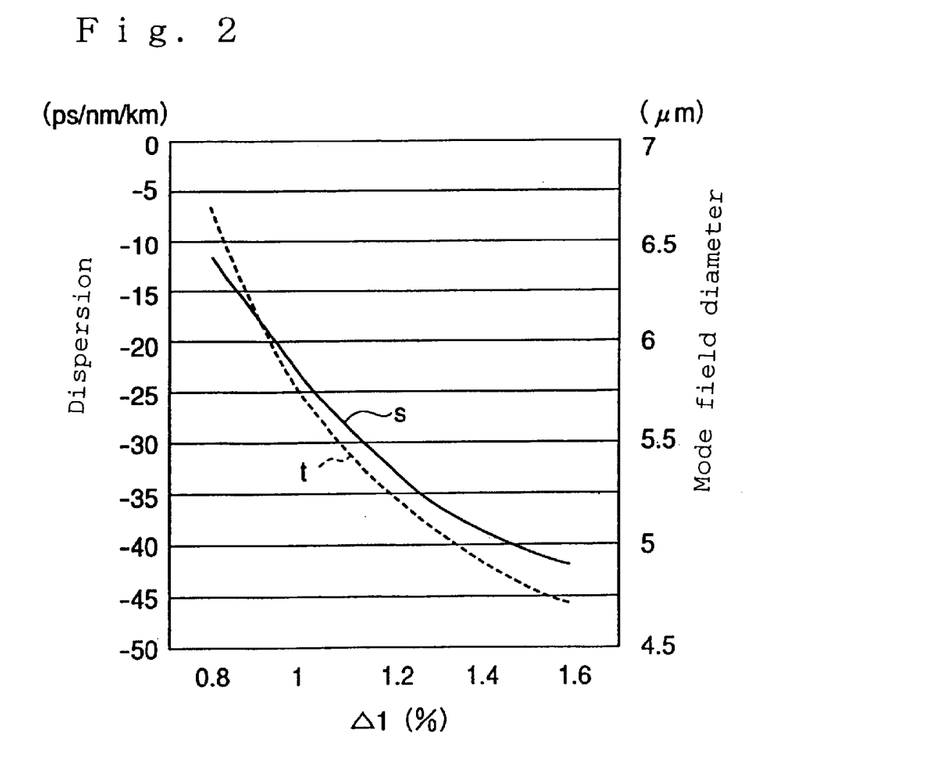
FIG. 2 is a graph showing a relationship between a value of Δ1 of a dispersion compensating optical fiber in the above preferred embodiment.

Next, where Ra was established to be approx. 0.45 and RΔ was established to be approx. −0.38, it was examined how the dispersion of a dispersion compensating optical fiber and the mode field diameter were changed when changing Δ1. FIG. 2 shows the results thereof. The characteristic line s shown in the same drawing indicates changes of the dispersion, and another characteristic line t shown in the same drawing indicates changes of the mode field diameter. Further, when carrying out the examination, Ra was micro-adjusted around a value close to 0.45, and RΔ was also micro-adjusted around a value close to −0.38, so that the compensation ratio of the dispersion compensating optical fiber became approx. 100%.

As has been made clear from FIG. 2, the smaller the Δ1 becomes, the larger the mode field diameter becomes while the smaller the dispersion becomes. And, in a range of Δ1=0.8% through 1.6% as shown in the same drawing, in either case, it was understood that the dispersion value became in a range of −10 ps/nm/km through −50 ps/nm/km.

Also, in general, although the mode field diameter is increased in line with a decrease in Δ1, the absolute value of the dispersion value becomes smaller and smaller, and at the same time, the cutoff wavelength becomes small. As the cutoff wavelength becomes 800 nm or less, generally, the bending loss is increased, and in particular, as the cutoff wavelength becomes 770 nm or less, the value of the bending loss at a bending diameter of, for example, 20 mm, becomes larger than 10 dB/m. Therefore, in the preferred embodiment, taking this point into consideration, Δ1 was determined to be 1.0 through 1.4% (preferably, 1.1 through 1.3%).

Figure 3:
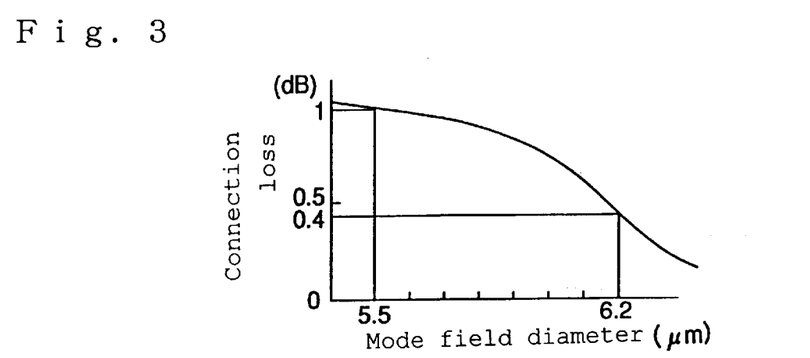
FIG. 3 is a graph showing a relationship between the mode field diameter of a dispersion compensating optical fiber and a connection loss when the dispersion compensating optical fiber is fused and connected to a single mode optical fiber.

In addition, as shown in FIG. 3, the connection loss was examined, when a dispersion compensating optical fiber and a single mode optical fiber are fused and connected to each other, by variously changing the mode field diameter

TABLE 1

| Ra | Core diameter [μm] | λC [nm] | Dispersion [ps/nm/km] | Dispersion slope [ps/nm²/km] | MFD [μm] | Aeff [μm²] | β/k | Compensation Ratio [%] |
|---|---|---|---|---|---|---|---|---|
| 0.35 | 14.24 | 768 | −18.34 | −0.0662 | 5.54 | 22.65 | 1.44532 | 99.6 |
| 0.40 | 12.65 | 779 | −20.90 | −0.0763 | 5.58 | 23.06 | 1.44551 | 99.3 |
| 0.45 | 11.32 | 785 | −24.91 | −0.0903 | 5.65 | 23.78 | 1.44562 | 100.0 |
| 0.50 | 9.98 | 770 | −36.32 | −0.1297 | 5.86 | 25.90 | 1.44546 | 101.5 |

(showing the value when transmitting a light of a wavelength band of 1.55 μm) of the dispersion compensating optical fiber, wherein if the mode field diameter is made into 5.5 μm or more, the connection loss becomes 1 dB or less, and satisfactory connection loss properties can be obtained. In particular, it was understood that, if the mode field diameter is made into 6.2 μm or more, the connection loss becomes 0.4 dB or less, and further satisfactory connection loss properties could be obtained. Further, the mode field diameter of the single mode optical fiber is approx. 10 μm when a light of a wavelength band of 1.55 μm is transmitted.

On the basis of the results of examinations made above, the present inventor examined the optimizing of a refractive index profile of a dispersion compensating optical fiber so that low dispersion can be achieved in a wide range of a wavelength band of 1.55 μm when a dispersion compensating optical of the preferred embodiment is connected to a single mode optical fiber (a dispersion compensating optical fiber, which is longer than one-third or more of the length of the single mode optical fiber, is connected), and an optical transmission line formed by connecting the dispersion compensating optical fiber of the embodiment to the single mode optical fiber becomes suitable as a wavelength division multiplexing transmission line. As a result, when the refractive index profile of the dispersion compensating optical fiber is made into a W-shaped refractive index profile as in the preferred embodiment, the inventor achieved a result that it is adequate to set $\Delta 1$, $\Delta 2/\Delta 1$, and Ra to $1.0\% \leq \Delta 1 \leq 1.4\%$, $-0.45 \leq \Delta 2/\Delta 1 \leq -0.285$, and $0.4 \leq Ra 0.5$ (preferably, $0.45 < Ra < 0.50$), respectively, and in the preferred embodiment, $\Delta 1$, $\Delta 2/\Delta 1$, and Ra were determined to be set in this range.

By thus determining the refractive index profile of a dispersion compensating optical fiber of the preferred embodiment, it is possible to construct a dispersion compensating optical fiber in which the dispersion slope at a wavelength band of 1.55 μm is negative, and its absolute value is almost equal to the absolute value of the dispersion slope of a single mode optical fiber, the dispersion value σat the abovementioned wavelength band is $-50$ ps/nm/km $\leq \sigma < -20$ ps/nm/km, the transmission loss at the wavelength band is 0.25 db/km or less, the polarization mode dispersion value at the wavelength band is $0.15$ ps/km$^{1/2}$ or less, and the deviation of the dispersion values at the wavelength band of 1.55 μm is 1 ps/nm/km or less, and the mode field diameter is 5.5 μm or more.

Also, in order for a moduled dispersion compensating optical fiber in the prior arts to compensate dispersion propagating through a single mode optical fiber by such a short length, a high negative dispersion value and a high negative dispersion slope were pursued. Therefore, the relative refractive index difference (the relative refractive index difference of the center core with respect to the cladding) of the center core of the dispersion compensating optical fiber having a W-shaped profile became a large value of nearly 2%, and moreover, there is a situation where the core diameter must be made small (narrow). Accordingly, since the mode field diameter of a moduled dispersion compensating optical fiber in the prior arts is 5 μm at most even though it is increased, a distortion in the waveform due to a non-linear phenomenon became a large value. On the contrary, a dispersion compensating optical fiber of the preferred embodiment has a low negative dispersion value and a low negative dispersion slope, whereby regulations of designing parameters to determine the W-shaped profile are slackened. Therefore, the mode field diameter could be increased, and a low non-linearity could be obtained.

On the basis of the experiments carried out by the inventor, it was confirmed that the dispersion compensating optical fiber according to the preferred embodiment could sufficiently achieve the condition of the mode field diameter being 5.5 μm or more, at a wavelength band of 1.55 μm while maintaining the transmission due to bending of a diameter of 20 mm at 1 dB/m or less. The value can sufficiently meet the condition as an optimal optical fiber for transmission for a wavelength division multiplexing transmission, having a low non-linearity, which can sufficiently meet bending as an optical transmission line.

Furthermore, since the dispersion compensating optical fiber of the preferred embodiment is such that the transmission loss at a wavelength band of 1.55 μm is 0.25 dB/km or less, and the polarization mode dispersion value at the wavelength band of 1.55 μm is $0.15$ ps/km$^{1-2}$ or less, a wavelength division multiplexed light can be transmitted when it is passed through the dispersion compensating optical fiber, without any hindrance, at a loss and deflection (strain due to polarization mode dispersion) equivalent to a case where the light is transmitted through a single mode optical fiber such as the existing dispersion shifted optical fiber, etc.

Figure 4:
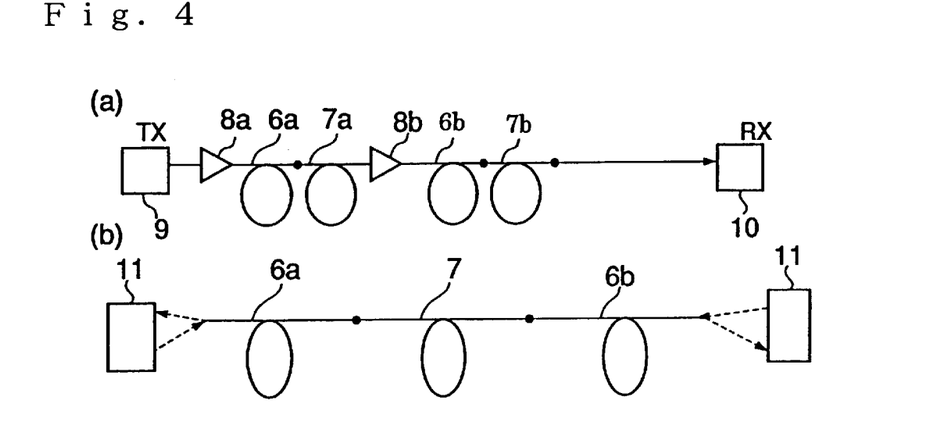
FIG. 4 is an explanatory view of a wavelength division multiplexing transmission line using a dispersion compensating optical fiber of the abovementioned preferred embodiment.

FIG. 4(a) shows one example of a wavelength division multiplexing transmission line formed of a dispersion compensating optical fiber according to the preferred embodiment. As shown in the same drawing, the optical transmission line is constructed in the form of the following connection pattern. That is, an erbium doped optical fiber amplifier (EDFA) 8a is connected to an optical transmission portion (TX) 9, the incident end of a single mode optical fiber 6a is connected to the emitting end of the EDFA 8a, the incident end of a dispersion compensating optical fiber 7a of the present invention is connected to the emitting end of the single mode optical fiber 6a, wherein the EDFA 8a is connected to the emitting end of the dispersion compensating optical fiber 7a, the single mode optical fiber 6bis connected to the emitting end of the EDFA 8a, and the dispersion compensating optical fiber 7b is connected to the emitting end of the single mode optical fiber 6b, in this order. Further, an optical receiving portion (RX) is connected to the emitting end of the dispersion compensating optical fiber 7b.

In general, the length of the present optical transmission line used for a wavelength division multiplexing optical transmission is approx. 40 through 60 km. The present inventor considers that the entire length of a wavelength division multiplexing optical transmission line in which the dispersion compensating optical fiber of the invention is made into approx. 40 through 60 km, which is the same as that of optical transmission lines generally used at present. Also, it is considered that the ratio, in length, of a dispersion compensating optical fiber of the invention to a single mode optical fiber is, for example, 1:1 through 1:3. In a wavelength division multiplexing transmission line shown in FIG. 4(a), the single mode optical fibers 6a and 6b and dispersion compensating optical fibers 7a and 7b are formed to be equal to each other.

In the dispersion compensating optical fiber of the above preferred embodiment, the effective core cross-sectional area ($A_{eff}$) is improved by approx. 1.3 times in the mode field diameter in comparison with the dispersion compensating optical fibers of the prior arts. However, it is only one-third or so in comparison with the effective core cross-sectional area of a single mode optical fiber. Therefore, when constructing an optical transmission line as described above, it is preferable that single mode optical fibers 6a and 6b are, respectively, connected to the emitting ends of the EDFA 8a and 8b as shown in FIG. 4(a) in order to suppress the non-linear phenomenon in a wavelength division multiplexing optical transmission line, and the dispersion compensating optical fibers of the preferred embodiment are connected to the emitting ends of the single mode optical fibers 6a and 6b.

That is, the abovementioned non-linear phenomenon is further likely to occur in line with an increase in intensity of a wavelength division multiplexed light incident into an optical fiber. But, since the single mode optical fibers 6a and 6b are of a low non-linear type, the non-linear phenomenon is not produced even though a wavelength division multiplexed light whose intensity is increased by the EDFA 8a and 8b is made incident into and propagates through the single mode optical fibers 6a and 6b. The wavelength division multiplexed light has the intensity reduced while propagating through the single mode optical fibers 6a and 6b. Therefore, even though the wavelength division multiplexed light is made incident into the dispersion compensating optical fibers 7a and 7b, no large non-linear phenomenon occurs. The wavelength division multiplexed optical transmission line shown in FIG. 4(a) is constructed so that the wavelength division multiplexed light outputted from the EDFA is caused to propagate through the single mode optical fiber and the dispersion compensating optical fiber in this order. Accordingly, the abovementioned non-linear phenomenon can be made very slight.

And, the dispersion and dispersion slope of the single mode optical fibers 6a and 6bare counterbalanced by those of the dispersion compensating optical fiber 7a and 7b at the wavelength band of 1.55 μm. Therefore, a flat low dispersion property can be obtained at the same wavelength. Therefore, a wavelength division multiplexing optical transmission line shown in FIG. 4(a) becomes an optical transmission line suitable for a wavelength division multiplexing optical transmission system.

FIG. 4(b) shows another example of a wavelength division multiplexing optical transmission line formed by using a dispersion compensating optical fiber according to the preferred embodiment. As shown in the same drawing, the optical transmission line is formed by causing a dispersion compensating optical transmission line of the present embodiment to intervene between single mode optical fibers 6a and 6b, and an optical transmission and receiving portion 11 is connected to the single mode optical fibers 6a and 6b, respectively. The optical transmission line shown in FIG. 4(b) is an optical transmission line for a bi-directional transmission system which bi-directionally transmits a wavelength division multiplexed light transmitted from the optical transmitting and receiving portion 11. When such an optical transmission line is constructed, it was confirmed that a flat low dispersion property at a wavelength of 1.55 μm could be obtained as in the optical transmission line shown in FIG. 4(a), by adjusting the ratio of the lengths of the single mode optical fiber 6a and 6b to that of the dispersion compensating optical fibers 7a and 7b.

Next, a description is given of a further detailed embodiment of a dispersion compensating optical fiber of the present invention. The inventor produced dispersion compensating optical fibers, as trial samples, which have the values of Δ1, RΔ, Ra and core diameter shown in Table 2, as the first embodiment. In these dispersion compensating optical fibers, the dispersion values at a wavelength band of 1.55 μm and values of dispersion slope at a wavelength band of 1.55 μm (herein, the average value of the dispersion values at wavelength bands of 1.53 through 1.57 μm) were measured. Also, when determining Δ1, RΔ, Ra and core diameter of the dispersion compensating optical fibers produced as the trial samples, RΔ and Ra are set to values in the vicinity of the optimal values obtained in the simulation, and Δ1 is made small, whereby an attempt at achieving both a low non-linearity and a high compensation ratio was made.

TABLE 2

| Δ1 | RΔ | Ra | Core diameter | Dispersion value | Dispersion slope |
|---|---|---|---|---|---|
| 1.11% | −0.385 | 0.45 | 11.2 [μm] | −16.64 [ps/nm/km] | −0.057 [ps/nm²/km] |
| 1.28% | −0.365 | 0.45 | 9.1 [μm] | −19.41 [ps/nm/km] | −0.069 [ps/nm²/km] |

In the two dispersion compensating optical fibers illustrated in Table 2, the mode field diameter becomes approx. 5.8 μm in either case, and since the Δ1 is small, the non-linear refractive index (proportionate to the amount of germanium in the center core) is small, and a low non-linearity can be expected.

Next, as the second embodiment, the inventor additionally produced several dispersion compensating optical fibers having a refractive index profile which is near the refractive index profile shown in Table 2, wherein the properties of the additionally produced dispersion compensating optical fibers were measured. The results are shown in Table 3.

TABLE 3

| Sample | Line length [km] | Transmission loss [dB/km] | Dispersion [ps/nm/km] | Dispersion slope [ps/nm²/km] | MFD [μm] | Bending loss [dB/m] | λc [nm] | Compensation ratio [%] |
|---|---|---|---|---|---|---|---|---|
| #1 | 20.0 | 0.245 | −15.1 | −0.050 | 5.83 | 8.9 | 847 | 93.0 |
| #2 | 22.0 | 0.250 | −22.1 | −0.095 | 5.84 | 9.8 | 834 | 120.7 |
| #3 | 20.0 | 0.230 | −26.1 | −0.068 | 5.71 | 6.2 | 829 | 72.9 |
| #4 | 10.0 | 0.245 | −16.8 | −0.062 | 5.77 | 9.9 | 836 | 101.3 |
| #5 | 10.0 | 0.225 | −30.2 | −0.090 | 5.75 | 7.5 | 810 | 83.8 |
| #6 | 19.0 | 0.240 | −27.4 | −0.075 | 5.73 | 5.3 | 829 | 76.7 |
| #7 | 12.0 | 0.250 | −43.8 | −0.120 | 5.55 | 9.8 | 784 | 76.7 |
| #8 | 5.0 | 0.250 | −11.9 | −0.031 | 5.65 | 4.1 | 831 | 72.0 |
| #9 | 11.0 | 0.230 | −23.4 | −0.055 | 5.68 | 3.5 | 835 | 66.2 |
| #10 | 20.0 | 0.265 | −20.7 | −0.078 | 5.77 | 9.7 | 847 | 103.7 |
| #11 | 14.0 | 0.250 | −13.2 | −0.038 | 5.77 | 9.0 | 856 | 80.0 |
| #12 | 8.0 | 0.235 | −11.7 | −0.028 | 5.75 | 2.6 | 871 | |

Further, in Table 3, #1 through #12, respectively, indicate sample numbers of dispersion compensating optical fibers. Also, the "transmission loss" indicates values when a light of a wavelength 1.55 μm is made incident, the "dispersion value" indicates dispersion values at a wavelength of 1.55 μm, the "dispersion slope" indicates dispersion slope values (the average value of dispersion values at wavelength bands of 1.53 through 1.57 μm) at a wavelength of 1.55 μm, the "mode field diameter" indicates values when having transmitted a light of a wavelength band of 1.55 μm, and the "bending loss" indicates values of the bending loss at a bending loss of 20 mm. Further, λc indicates the cutoff wavelength.

As has been made clear on Table 3, the compensation ratios of the dispersion compensating optical fibers (#1 through #12) of the preferred embodiments are from approx. 65% through approx. 120%. That is, two-thirds of all the dispersion compensating optical fibers shown in Table 3 are included in a range from approx. 75% through approx. 125%, which are the target values of the compensation ratio, whereby it was possible to produce dispersion compensating optical fibers having a compensation ratio which has no problem in practical applications.

Furthermore, the dispersion value a of the dispersion compensating optical fibers shown in Table 3 at a wavelength of 1.55 μm becomes −50 ps/nm/km ≦σ≦−10 ps/nm/km, which is a value comparatively close to a negative value. Therefore, the length of a dispersion compensating optical fiber, which compensates the dispersion value of a single mode optical fiber, necessarily becomes long. Accordingly, by connecting a dispersion compensating optical fiber to a single mode optical fiber over one-third or more (for example, the length of the dispersion compensating optical fiber to that of the single mode optical fiber =1:3 through 1:1) of the length of the single mode optical fiber corresponding to the dispersion σ=17 ps/nm/km of the single mode optical fiber at a wavelength of 1.55 μm, the dispersion value of the single mode optical fiber can be almost counterbalanced (nullified).

And, in these dispersion compensating optical fibers, the transmission loss at a wavelength band of 1.55 μm is small, and the mode field diameter is larger than the mode field diameter (approx. 5.0 μm) of the dispersion compensating optical fibers in the prior arts. Still further, the transmission loss and bending loss are also small. The dispersion compensating optical fibers could become very excellent and suitable for wavelength division multiplexing transmissions.

Next, the dispersion compensating optical fibers (#1 through #12) and single mode optical fibers having zero dispersion at a wavelength band of 1.31 μm were fused and connected to each other, and the connection losses thereof were measured. The results indicated that the average connection loss became approx. 0.8 dB.

Also, the present inventor used a dispersion shifted optical fiber having zero dispersion at a wavelength band of 1.55 μm and a mode field diameter of approx. 8 μm as an intermediate mode field optical fiber, and connected it between the respective dispersion compensating optical fibers (#1 through #12) and single mode optical fibers. And the inventor measured the total value of adding the connection loss between the dispersion shifted optical fiber and the dispersion compensating optical fibers to the connection loss between the dispersion shifted optical fiber and the single mode optical fibers. The results were that the average value was approx. 0.5 dB, which was smaller than in the case where the dispersion compensating optical fibers and single mode optical fibers are connected to each other.

Next, the inventor formed a wavelength division multiplexing optical transmission line by connecting the abovementioned dispersion shifted optical fiber between the respective dispersion compensating optical fibers and single mode optical fibers, and measured the dispersion characteristics. Also, at this time, the lengths of the dispersion compensating optical fibers and the single mode optical fibers were, respectively, determined to be 20 km, and the length of the dispersion shifted optical fiber was determined to be 2 m. The results are as shown by a characteristic line b in FIG. 5. In addition, a characteristic line a in the same drawing indicates the dispersion characteristics of the single mode optical fiber, and characteristic line c indicates the dispersion characteristics of the dispersion compensating optical fibers.

Figure 5:
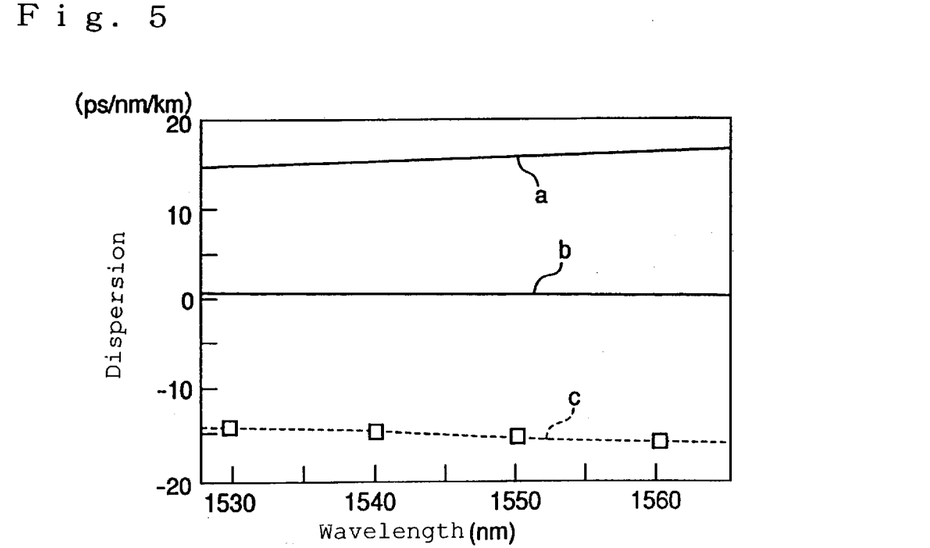
FIG. 5 is a graph showing the dispersion properties of an optical transmission line, at a wavelength of 1.55 μm, which is formed by connecting a short dispersion shifted optical fiber between the dispersion compensating optical fiber of the abovementioned preferred embodiment and a single mode optical fiber as an intermediate mode field optical fiber, along with the respective independent dispersion properties of a dispersion compensating optical fiber at the same wavelength band and the single mode optical fiber.

As has been made clear in FIG. 5, by connecting a dispersion compensating optical fiber of the present embodiment to a single mode optical fiber by the same length, it was confirmed that a wavelength division multiplexing optical transmission line whose dispersion and dispersion value are flat at a wavelength band of 1.55 μm can be produced.

In addition, when producing a wavelength division multiplexing optical transmission line by connecting a dispersion shifted optical fiber having zero dispersion at the wavelength band of 1.55 μm between a single mode optical fiber and a dispersion compensating optical fiber, the length of the dispersion shifted optical fiber is not specially limited but may be adequately determined. However, since the dispersion slope of the abovementioned dispersion shifted optical fiber is approx. 0.1 ps/nm2/km at the abovementioned wavelength band, it is preferable that the length of the dispersion shifted optical fiber is less than 1/1000 of the length of the single mode optical fiber directly connected to the dispersion shifted optical fiber so that flat dispersion characteristics (property in which the dispersion value becomes close to zero and the dispersion slope becomes flat) obtained by connecting the single mode optical fiber to the dispersion compensating optical fibers.

As described above, the inventor considers that the length of a wavelength division multiplexing optical transmission line formed by using a dispersion compensating optical fiber of the invention is, for example, approx. 40 km through approx. 60 km. However, taking those into consideration, a case where a length of several hundreds of kilometers is longer than the above, and further a case where a length is shorter than the above, the shortest length of a single mode optical fiber is considered to be 5 km. In this case, if the length of a dispersion shifted optical fiber is made into less than approx. 5 km, a flat dispersion characteristic which is obtained by connecting a single mode optical fiber and a dispersion compensating optical fiber to each other cannot be lost.

Also, where the length of the dispersion shifted optical fiber is more than approx. 1 km but less than approx. 5 km, it is possible to securely display an effect of suppressing a connection loss due to a difference between the mode field diameter of a single mode optical fiber and that of a dispersion compensating optical fiber as described above, and it becomes possible to easily incorporate a dispersion shifted optical fiber in an optical transmission line as a module. Therefore, it is preferable that the length of a dispersion shifted optical fiber incorporated between a single mode optical fiber and a dispersion compensating optical fiber is more than approx. 1 m but less than approx. 5 m.

Figure 6:
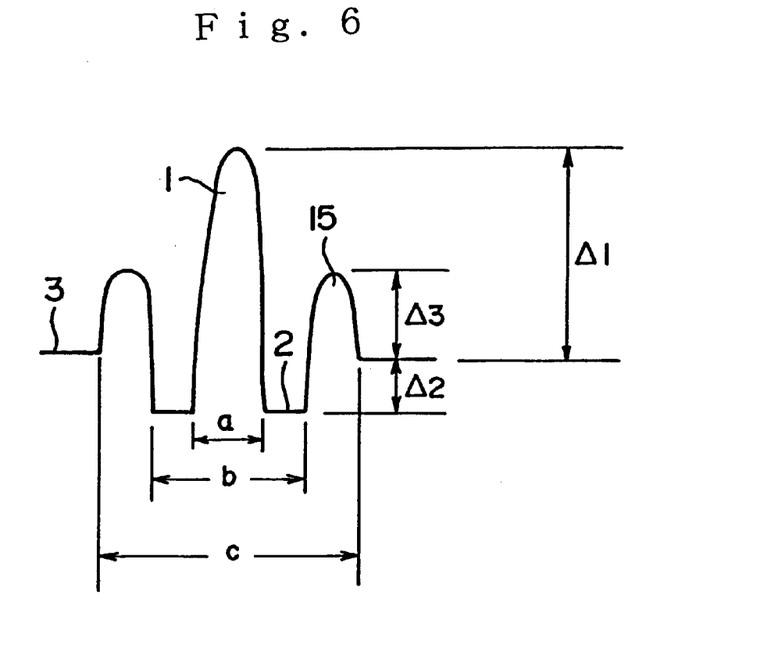
FIG. 6 is a view showing the refractive index profile of a dispersion compensating optical fiber of another preferred embodiment of the invention.

Next, a description is given of a preferred embodiment of a dispersion compensating optical fiber having a different refractive index profile. The refractive index profile of the dispersion compensating optical fiber is in the form of a combination of a W shape and segment type as shown in FIG. 6. That is, the circumference of the center core 1 is covered by the side core 2, and the circumference of the side core 2 is covered by a second side core 15, and further the outside of the second side core 15 is covered by a cladding 3.

Further, in FIG. 6, $\Delta 1$ indicates the relative refractive index difference of the center core 1 with respect to the cladding 3, $\Delta 2$ indicates the relative refractive index difference of the side core 2 with respect to the cladding 3, and $\Delta 3$ indicates the relative refractive index difference of the second side core 15 with respect to the cladding 3. And, a relationship of $\Delta 1 > \Delta 3 > \Delta 2$ is established among $\Delta 1$, $\Delta 2$, and $\Delta 3$.

Further, the value a/b of the outer diameter a of the center core with respect to the outer diameter b of the side core 2 is the same as the value a/b of a dispersion compensating optical fiber (fiber of a refractive index profile shown in FIG. 1) having a W-shaped refractive index profile described above, and the value b/c of the outer diameter b of the side core 2 with respect to the outer diameter c of the second side core 15 is determined in a range from 1.3 through 1.5.

A dispersion compensating optical fiber of the preferred embodiment is connected to a fiber having a positive dispersion value and has both a function to compensate the dispersion of a fiber having a positive dispersion value and a function to transmit signals as in the abovementioned dispersion compensating optical fiber having a W-shaped refractive index profile. In order to cause the dispersion compensating optical fiber to have both functions, the dispersion compensating optical fiber of the preferred embodiment is such that the fiber has a negative dispersion slope and the dispersion slope $\sigma$ at a wavelength band of 1.55 $\mu$m is made into $-50$ ps/nm/km $\leq \sigma < -20$ ps/nm/kw (more preferably, $-20$ ps/nm/km $\leq \sigma < -10$ ps/nm/km), the transmission loss is determined to be 0.3 dB/km or less (more preferably, 0.25 dB/km or less), the polarization mode dispersion value is 0.15 ps/km$^{1/2}$ or less, and the mode field diameter is 5.5 $\mu$m or more.

Table 4 shows the results of simulation of the refractive index profile and propagation properties of a dispersion compensating optical fiber where the mode field diameter is 6.2 $\mu$m.

subtracting the minimum value (0.01 ps/nm/km) from the maximum value (0.13 ps/nm/km) becomes approx. 0.12 ps/nm/km, and the average dispersion slope at this wavelength was 0.003 ps/nm$^2$/km in a positive inclination, and was $-0.008$ ps/nm$^2$/km in a negative inclination.

Thus, it has been proven that the dispersion compensating optical fiber of the preferred embodiment has excellent properties as a dispersion compensating optical fiber.

Also, the invention is not limited to the embodiments and examples described above, but may be subjected to various modifications. For example, although, in the abovementioned preferred embodiments, a wavelength division multiplexing transmission line as shown in FIGS. 4(*a*) and (*b*) is formed by using a dispersion compensating optical fiber, the wavelength division multiplexing transmission line is not necessarily an optical transmission line as shown in the same drawings. For example, an adequate transmission line may be formed by connecting a dispersion compensating optical fiber of the present invention, whose length is approx. one-third or more of that of a single mode optical fiber, to the single mode optical fiber having zero dispersion at a wavelength band of 1.31 $\mu$m.

Also, thus, when forming a wavelength division multiplexing optical transmission line by connecting a dispersion compensating optical fiber of the present invention, whose length is approx. one-third or more of that of a single mode optical fiber, to the single mode optical fiber having zero dispersion at a wavelength band of 1.31 $\mu$m, it is preferable that the connection loss at a connection portion between the single mode optical fiber and the dispersion compensating optical fiber is 0.4 dB or less.

Because, for example, where it is assumed that the length of a single mode optical fiber is 20 through 30 km, the length of a dispersion compensating optical fiber is 20 km through 10 km, the total length of the optical transmission line is 40 km, and the transmission loss between the single mode optical fiber and dispersion compensating optical fiber at a wavelength band of 1.55 $\mu$m is approx. 0.2 dB, the transmission loss in the total length of the optical transmission line becomes approx. 8 dB. Herein, if the connection loss between the single mode optical fiber and dispersion com-

TABLE 4

| $\Delta 1$ % | $\alpha$ | $\Delta 2$ % | $\Delta 3$ % | Core diameter $\mu$m | Dispersion ps/nm/km | Dispersion slope ps/nm$^2$/km | MFD $\mu$m | $\lambda$c nm |
|---|---|---|---|---|---|---|---|---|
| 0.92 | 2.0 | $-0.30$ | 0.25 | 12.15 | $-29.47$ | $-0.085$ | 6.48 | 1156 |
| 0.80 | 2.0 | 0.25 | 0.20 | 17.69 | $-15.30$ | $-0.051$ | 6.72 | 1155 |
| 0.77 | 2.0 | $-0.25$ | 0.20 | 17.83 | $-15.98$ | $-0.051$ | 6.95 | 1183 |

In a dispersion compensating optical fiber having results of simulation as shown in Table 4 can enlarge the mode field diameter to 6.2 $\mu$m or more in a range of $\Delta 1 = 0.75$ through 0.95% and $\Delta 3 = 0.20$ through 0.30%, wherein the bending loss at the bending diameter of 20 mm becomes approx. 10 dB/m.

Figure 7:
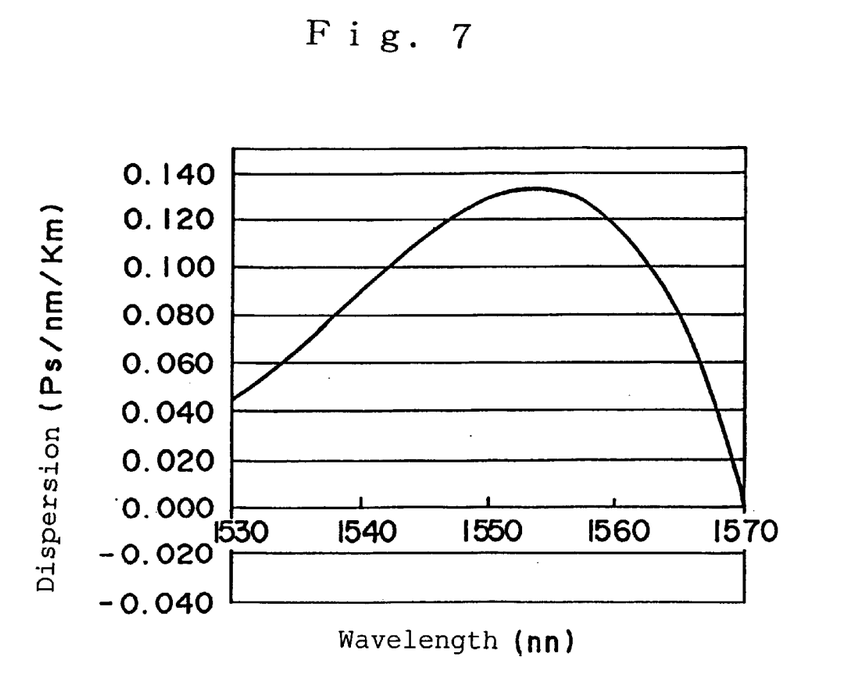
FIG. 7 is a graph showing the dispersion properties of a transmission line, at a wavelength band of 1530 nm through 1570 nm, in which the dispersion compensating optical fiber and a single mode optical fiber are connected.

FIG. 7 shows dispersion characteristics of a transmission line in which a dispersion compensating optical fiber of the preferred embodiment is connected to a single mode optical fiber for transmission, which has a positive dispersion value. In this example, the length of the single mode optical fiber is almost equal to that of the dispersion compensating optical fiber, and the total length is approx. 200 km. As has been made clear in the same drawing, in a range from 1530 nm through 1570 nm in wavelength, a value obtained by pensating optical fiber is made into 0.4 dB or less, the connection loss thereof becomes one-twentieth or less of the transmission loss (8 dB) in the total length of the optical transmission line, whereby the connection loss can be disregarded with respect to the loss level of the optical transmission loss.

Further, since the dispersion compensating optical fiber of the invention is used while being connected to a single mode optical fiber, it is possible to obtain an optical transmission line suited to a wavelength division multiplexing transmission line. However, usage of the dispersion compensating optical fiber of the invention is not specially limited, but may be applicable to other adequate usages. For example, a dispersion compensating optical fiber of the invention may be connected to optical fibers having a positive dispersion value other than the single mode optical fibers, thereby forming an optical transmission line.

INDUSTRIAL APPLICABILITY

As described above, a dispersion compensating optical fiber according to the invention is suitable for transmitting optical signals of a long haul while compensating dispersion of an optical fiber having a positive dispersion value at a wavelength band of 1.55 μm by being connected to the optical fiber. Also, a wavelength division multiplexing optical transmission line using the dispersion compensating optical fiber of the invention is suitable for suppressing signal degradation in line with a non-linearity and transmitting wavelength division multiplexed high density optical signals of low dispersion at a high rate of a long haul.

What is claimed is:

1. A dispersion compensating optical fiber for compensating a dispersion property of an optical fiber having a positive dispersion value at a wavelength band of 1.55 μm, wherein, in the wavelength band of 1.55 μm, the dispersion value and dispersion slope are negative, transmission loss is 0.3 dB/km or less, polarization mode dispersion value is 0.15 ps/km$^{1/2}$ or less, bending loss value is 10 dB/m or less, and mode field diameter is 5.5 μm or more.

2. A dispersion compensating optical fiber as set forth in claim 1, wherein the dispersion value σ at a wavelength band of 1.55 μm is $-50$ ps/nm/km$\leq \sigma < -20$ ps/nm/km.

3. A dispersion compensating optical fiber as set forth in claim 2, wherein the transmission loss at a wavelength band of 1.55 μm is 0.25 dB/km or less.

4. A dispersion compensating optical fiber as set forth in claim 1, wherein the dispersion value σ is $-20$ ps/nm/km$\leq \sigma \leq -10$ ps/nm/km.

5. A dispersion compensating optical fiber as set forth in claim 4, wherein the transmission loss at a wavelength band of 1.55 μm is 0.25 dB/km or less.

6. A dispersion compensating optical fiber as set forth in claim 1, wherein said dispersion compensating optical fiber is formed by covering the outer circumference of a center core by a side core whose refractive index is lower than that of said center core, and covering the outer circumference of said side core by cladding whose refractive index is higher than that of said side core but is lower than that of said center core, $1.0\% \leq \Delta 1 \leq 1.4\%$ and $-0.45 \leq \Delta 2/\Delta 1 \leq -0.285$ are established where the relative refractive index difference of said center core with respect to said cladding is $\Delta 1$, and the relative refractive index difference of said side core with respect to said cladding is $\Delta 2$, and further $0.4 < Ra < 0.5$ is established where the value a/b of the outer diameter a of the center core with respect to the outer diameter b of the side core is Ra.

7. A dispersion compensating optical fiber as set forth in claim 6, wherein the mode field diameter is 6.2 μm.

8. A dispersion compensating optical fiber as set forth in claim 1, wherein the mode field diameter is 6.2 μm.

9. A wavelength division multiplexing optical transmission line constructed by connecting an optical fiber having a positive dispersion value at a wavelength band of 1.55 μm and a dispersion compensating optical fiber described in claim 1, wherein the dispersion value at the wavelength band of 1.55 μm is $-1$ ps/nm/km or more but 1 ps/nm/km or less.

10. A wavelength division multiplexing optical transmission line as set forth in claim 9, wherein an intermediate mode field optical fiber having a mode field diameter between the mode field diameter of an optical fiber having a positive dispersion value and the mode field diameter of a dispersion compensating optical fiber is connected between said optical fiber having a positive dispersion value and said dispersion compensating optical fiber, and the length of said intermediate mode field optical fiber is determined to be 1/1000 or less of the length of said optical fiber having a positive dispersion value directly connected to said intermediate mode field optical fiber.

11. A wavelength division multiplexing optical transmission line as set forth in claim 10, wherein an intermediate mode field optical fiber is a dispersion shifted optical fiber having zero dispersion at a wavelength band of 1.55 μm.

12. A wavelength division multiplexing optical transmission line as set forth in claim 9, wherein an intermediate mode field optical fiber having a mode field diameter between the mode field diameter of an optical fiber having a positive dispersion value and the mode field diameter of a dispersion compensating optical fiber is connected between said optical fiber having a positive dispersion value and said dispersion compensating optical fiber, and the length of said intermediate mode field optical fiber is determined to be 1 m or more but 5 m or less.

13. A wavelength division multiplexing optical transmission line as set forth in claim 12, wherein an intermediate mode field optical fiber is a dispersion shifted optical fiber having zero dispersion at a wavelength band of 1.55 μm.

14. A wavelength division multiplexing optical transmission line as set forth in claim 9, wherein a loss at a connection portion between an optical fiber having a positive dispersion value and a dispersion compensating optical fiber is made into 0.4 dB or less.

15. A wavelength division multiplexing optical transmission line constructed by connecting an optical fiber having a positive dispersion value at a wavelength band of 1.55 μm and a dispersion compensating optical fiber described in claim 1, wherein the deviation of the dispersion value at the wavelength band of 1.55 μm is 1 ps/nm/km or less.

16. A wavelength division multiplexing optical transmission line as set forth in claim 15, wherein an intermediate mode field optical fiber having a mode field diameter between the mode field diameter of an optical fiber having a positive dispersion value and the mode field diameter of a dispersion compensating optical fiber is connected between said optical fiber having a positive dispersion value and said dispersion compensating optical fiber, and the length of said intermediate mode field optical fiber is determined to be 1/1000 or less of the length of said optical fiber having a positive dispersion value directly connected to said intermediate mode field optical fiber.

17. A wavelength division multiplexing optical transmission line as set forth in claim 16, wherein an intermediate mode field optical fiber is a dispersion shifted optical fiber having zero dispersion at a wavelength band of 1.55 μm.

18. A wavelength division multiplexing optical transmission line as set forth in claim 15, wherein an intermediate mode field optical fiber having a mode field diameter between the mode field diameter of an optical fiber having a positive dispersion value and the mode field diameter of a dispersion compensating optical fiber is connected between said optical fiber having a positive dispersion value and said dispersion compensating optical fiber, and the length of said intermediate mode field optical fiber is determined to be 1 m or more but 5 m or less.

19. A wavelength division multiplexing optical transmission line as set forth in claim 18, wherein an intermediate mode field optical fiber is a dispersion shifted optical fiber having zero dispersion at a wavelength band of 1.55 μm.

20. A wavelength division multiplexing optical transmission line as set forth in claim 15, wherein a loss at a connection portion between an optical fiber having a positive dispersion value and a dispersion compensating optical fiber is made into 0.4 dB or less.

21. A wavelength division multiplexing optical transmission line constructed by connecting an optical fiber having a positive dispersion value at a wavelength band of 1.55 μm and a dispersion compensating optical fiber described in claim wherein said optical fiber having a positive dispersion value is a single mode optical fiber having a zero dispersion wavelength at a wavelength band of 1.31 μm, and said dispersion compensating optical fiber has a length which is longer by one-third or more of the length of said single mode optical fiber.

22. A wavelength division multiplexing optical transmission line as set forth in claim 21, wherein an intermediate mode field optical fiber having a mode field diameter between the mode field diameter of an optical fiber having a positive dispersion value and the mode field diameter of a dispersion compensating optical fiber is connected between said optical fiber having a positive dispersion value and said dispersion compensating optical fiber, and the length of said intermediate mode field optical fiber is determined to be 1/1000 or less of the length of said optical fiber having a positive dispersion value directly connected to said intermediate mode field optical fiber.

23. A wavelength division multiplexing optical transmission line as set forth in claim 22, wherein an intermediate mode field optical fiber is a dispersion shifted optical fiber having zero dispersion at a wavelength band of 1.55 μm.

24. A wavelength division multiplexing optical transmission line as set forth in claim 21, wherein an intermediate mode field optical fiber having a mode field diameter between the mode field diameter of an optical fiber having a positive dispersion value and the mode field diameter of a dispersion compensating optical fiber is connected between said optical fiber having a positive dispersion value and said dispersion compensating optical fiber, and the length of said intermediate mode field optical fiber is determined to be 1 m or more but 5 m or less.

25. A wavelength division multiplexing optical transmission line as set forth in claim 24, wherein an intermediate mode field optical fiber is a dispersion shifted optical fiber having zero dispersion at a wavelength band of 1.55 μm.

26. A wavelength division multiplexing optical transmission line as set forth in claim 21, wherein a loss at a connection portion between an optical fiber having a positive dispersion value and a dispersion compensating optical fiber is made into 0.4 dB or less.

\* \* \* \* \*